(12) United States Patent
Smith et al.

(10) Patent No.: US 10,630,853 B2
(45) Date of Patent: Apr. 21, 2020

(54) EDGE SENSING

(71) Applicant: Hewlett-Packard Development Company, L.P., Spring, TX (US)

(72) Inventors: Ryan M Smith, San Diego, CA (US); Arthur H Barnes, Vancouver, WA (US); Eric Andersen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/329,870

(22) PCT Filed: Sep. 7, 2016

(86) PCT No.: PCT/US2016/050479
§ 371 (c)(1),
(2) Date: Mar. 1, 2019

(87) PCT Pub. No.: WO2018/048389
PCT Pub. Date: Mar. 15, 2018

(65) Prior Publication Data
US 2019/0245996 A1    Aug. 8, 2019

(51) Int. Cl.
*H04N 1/00* (2006.01)
*H04N 1/028* (2006.01)
*H04N 1/12* (2006.01)
*H04N 1/04* (2006.01)
*H04N 1/10* (2006.01)

(52) U.S. Cl.
CPC ....... *H04N 1/00748* (2013.01); *H04N 1/0057* (2013.01); *H04N 1/00551* (2013.01); *H04N 1/00689* (2013.01); *H04N 1/02825* (2013.01); *H04N 1/04* (2013.01); *H04N 1/1043* (2013.01); *H04N 1/1215* (2013.01)

(58) Field of Classification Search
CPC .......... B65H 2511/514; B65H 2513/51; B65H 2220/01; B65H 2220/02; B65H 3/04; B65H 3/30; B07C 3/082; B07C 2301/005; B07C 3/006; B07C 3/008; B07C 3/02; B07C 5/38; B07C 7/02; G02B 5/124; G06F 3/0416; G06F 3/0421; B65G 13/02; B65G 1/0485; B65G 1/0492; B65G 1/1373; B65G 2203/044; B65G 43/08
USPC ......... 271/150, 270, 34, 3.12; 358/498, 513, 358/514
See application file for complete search history.

(56) References Cited

U.S. PATENT DOCUMENTS

| | | |
|---|---|---|
| 4,018,504 A | 4/1977 | Wu et al. |
| 4,464,014 A | 8/1984 | Sick et al. |
| 4,507,557 A * | 3/1985 | Tsikos .................. G06F 3/0428 250/221 |
| 5,088,843 A | 2/1992 | Hori |

(Continued)

*Primary Examiner* — Negussie Worku
(74) *Attorney, Agent, or Firm* — Brooks Cameron & Huebsch PLLC

(57) ABSTRACT

Example implementations relate to an edge sensing apparatus. For example, an edge sensing apparatus consistent to the present disclosure may include a reflector in a beam path of a retroreflective sensor. The edge sensing apparatus consistent with the present disclosure may include a cover glass located between the retroreflective sensor and the reflector. The edge sensing apparatus consistent with the present disclosure may include a media feeder to feed a media along a media path between the cover glass and the retroreflective sensor.

20 Claims, 5 Drawing Sheets

(56) References Cited

U.S. PATENT DOCUMENTS

| | | | | |
|---|---|---|---|---|
| 5,409,204 A * | 4/1995 | Strohmeyer | ............. | B65H 3/04 |
| | | | | 271/150 |
| 5,936,238 A | 8/1999 | Bohn | | |
| 6,429,856 B1 * | 8/2002 | Omura | .................. | G06F 3/0416 |
| | | | | 178/18.09 |
| 6,570,103 B1 * | 5/2003 | Saka | ..................... | G06F 3/0416 |
| | | | | 178/18.01 |
| 7,327,502 B2 | 2/2008 | Sheng | | |
| 7,388,654 B2 | 6/2008 | Raab et al. | | |
| 8,405,636 B2 | 3/2013 | Bridger | | |
| 9,102,179 B2 | 8/2015 | Eiyama | | |
| 2002/0052703 A1 | 5/2002 | Tabet | | |
| 2005/0141055 A1 * | 6/2005 | Sheng | ................ | H04N 1/00588 |
| | | | | 358/498 |
| 2008/0180755 A1 * | 7/2008 | Bokelman | ............ | H04N 1/1013 |
| | | | | 358/474 |
| 2009/0044989 A1 * | 2/2009 | Sato | ..................... | G06F 3/0416 |
| | | | | 178/18.01 |
| 2009/0283960 A1 * | 11/2009 | Bokelman | ............ | B65H 3/0684 |
| | | | | 271/117 |
| 2009/0283964 A1 * | 11/2009 | Smith | ..................... | B65H 9/08 |
| | | | | 271/226 |
| 2014/0063570 A1 * | 3/2014 | Kaempflein | ........ | H04N 1/00702 |
| | | | | 358/488 |
| 2019/0217643 A1 * | 7/2019 | Valenzuela-Rivas | ........................ | |
| | | | | B41L 47/00 |
| 2019/0230238 A1 * | 7/2019 | Valenzuela | ........... | G03G 15/605 |

* cited by examiner

EDGE SENSING

BACKGROUND

Apparatuses for producing or reproducing media (e.g., hard copy documents), such as copiers, printers, telecommunications facsimile and digital sending machines, document scanners, multi-function devices (MFD), etc. can utilize optical scanners to generate an image of the media. The apparatuses can include an automatic document feeder (ADF) mechanism for automatically loading and unloading single sheets of media sequentially into a position for imaging utilizing the optical scanners.

DETAILED DESCRIPTION

Figure 1:
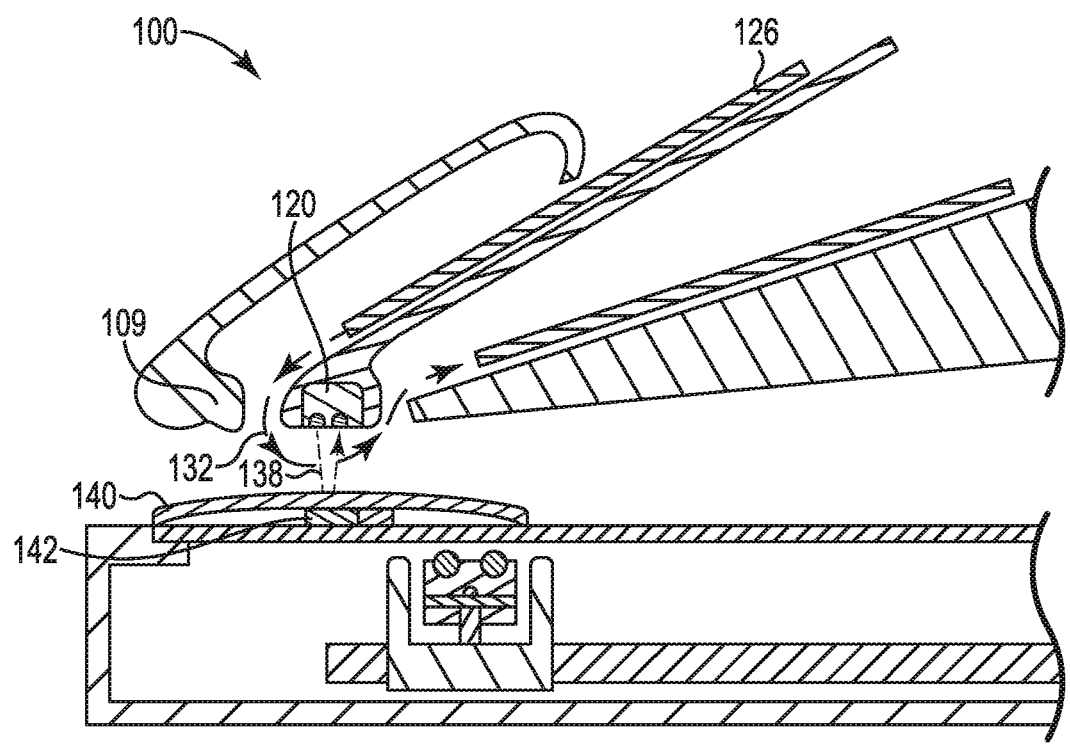
FIG. 1 illustrates a cross-sectional view of an example of an edge sensing apparatus in a closed configuration consistent with the present disclosure.

Edge sensing may be utilized to synchronize and/or meter automated scanning operations. Sensing an edge may be achieved utilizing a sensor. Previous sensors utilized in edge sensing are prone to damage, soiling, and wear that degrade the ability to accurately sense an edge and may lead to inappropriately synchronized and/or metered scanning operation. The apparatuses described herein may provide edge sensing with a damage resistant, soiling resistant, wear resistant, self-cleaning, easily accessible edge sensing sensor.

Apparatuses for producing or reproducing media (e.g., hard copy documents, sheet of paper, photograph, object, or other form of media) may utilize flatbed optical scanners. Optical scanners may operate by utilizing an optical sensor array to sense a light signal resulting from illumination of the media with a light source. The image of the scanned media may be projected onto an optical photo sensor array incrementally by the use of a moving scan line. The moving scan line may be produced either by moving the scanner optical assembly relative to the media, or by moving the media relative to the scanner optical assembly (e.g., scan bar). One or more of these methods may be utilized in a same flatbed scanner, handheld scanner or other scanner having manual and/or automatic feed capabilities.

An automatic document feeder (ADF) may be utilized to move the media relative to the scanner optical assembly. The ADF may include roller assemblies to feed media along a path that traverses the scanner optical assembly. In order to determine when to begin scanning and/or for registering an image relative to an edge of a page, scanning operations may be synchronized to the passage of media along the media path. For example, scanning operations may be synchronized by the detection of a leading edge of media passing through an ADF along the media path.

Optical sensors may be utilized to detect a leading edge of media. Optical sensors may utilize light (e.g., white light, infrared light, laser, etc.) emission and reception to detect a leading edge of media. For example, a retro-reflective sensor may be utilized to detect a leading edge of media. A retro-reflective sensor may include an emitter element and a receiver element. The emitter element and the receiver element may be located on a same face of a sensor. A reflector may be located across a media path and opposing to the emitter element and/or the receiver element. The emitter may emit light in a beam path that passes through a media path. The receiver element may receive reflected light. The reflected light may be light transmitted from the emitter element and reflected back to the receiver element off of either media or a reflector. An alteration in reflected light received by the receiver element may be interpreted as the presence of media. However, the reflector may only be more reflective than the object being sensed in order for retro-reflective sensor to be able to distinguish between media and non-media conditions in the media path. Furthermore, the background may become contaminated with debris, damaged, worn, etc. to the point where it reflects less light back to the emitter than the light reflected from the media.

In contrast, examples of the present disclosure describe an edge sensing apparatus including a reflector in a beam path of a retroreflective sensor, wherein the reflector is located on a surface of a scanner bed. The edge sensing apparatus may include a cover glass located between the retroreflective sensor and the reflector. The edge sensing apparatus may include a media feeder to feed media along a media path between the cover glass and the retroreflective sensor. The examples of the present disclosure may describe an edge sensing apparatus utilizing a retroreflective sensor and reflector that is more durable, less prone to contamination, easier to access for cleaning/repair/replacement/service, and/or self-cleaning as compared to existing retroreflective sensors.

FIG. 1 illustrates a cross-sectional view of an example of an edge sensing apparatus 100 in a closed configuration consistent according to with the present disclosure. The edge sensing apparatus 100 may include a media feeder 109. The media feeder 109 may include automatic media feeding mechanisms such as mechanical conveying roller assemblies and/or guides to feed media along a media path 132.

The edge sensing apparatus 100 may include a retroreflective sensor 120. The retroreflective sensor 120 may an emitter element. The emitter element may emit a beam of light. The beam of light may be transmitted in a beam path 138. The retroreflective sensor 120 may be positioned on and/or within an ADF housing such that the beam path 138 is directed across a media path 132. The edge sensing apparatus 100 may include a reflector 142. The reflector 142 may be positioned in the beam path 138 of the beam of light emitted from the retroreflective sensor 120. The reflector 142 may include a reflective film such as 3M Scotchlite™ Reflective material or 3M™ Daylighting polymeric film for example.

The edge sensing apparatus 100 may include a cover glass 140 located between the retroreflective sensor 120 and the reflector 142. The cover glass 140 may be a substantially transparent sheet of material. The cover glass 140 may be a same or a different material than a glass located under the reflector 142. The cover glass 140 may be a glass, a plastic, or a polyester material, for example. The cover glass 140 may have thermal, mechanical, and optical properties (e.g., refractive index, transmission, absorption, and/or wave length dependencies) substantially identical to those of glass located under the reflector 142. However, the cover glass 140 may be a material that is more resistant to soiling, abrasion, and/or other degradation than the glass located under the reflector 142.

The cover glass 140 may protect the reflector 142. The cover glass 140 may protect the reflector 142 by preventing abrasion, erosion, scratching, damaging, wearing, and/or other mechanical and/or chemical interactions with the reflector 142 that may alter its reflectivity. The cover glass 140 may protect the reflector 142 from soiling of the surface by debris that may alter its reflectivity. The cover glass 140 may protect the reflector 142 by sealing off and/or shielding a reflecting surface of the reflector 142. Sealing the reflector 142 may protect it from soiling with debris and/or from wear and tear associated with interfacing with media 126. The media feeder 109 may feed media 126 along the media path 132 between the cover glass 140 and the retroreflective sensor 120.

The retroreflective sensor 120 may sense the presence of media 126 in the media path 132 intersecting the beam path 138 by an alteration in the amount of reflected light detected at the receiving element of the retroreflective sensor 120. For example, the relatively highly reflective reflector 142 may direct a higher amount of reflected light to the receiver element than a piece of media 126. As a result, when media 126 interrupts the beam path 138, the receiver element may determine that media 126 is present in the media path 132 by virtue of a decreased detection of reflected light by the receiver element of the retroreflective sensor 120.

Figure 2:
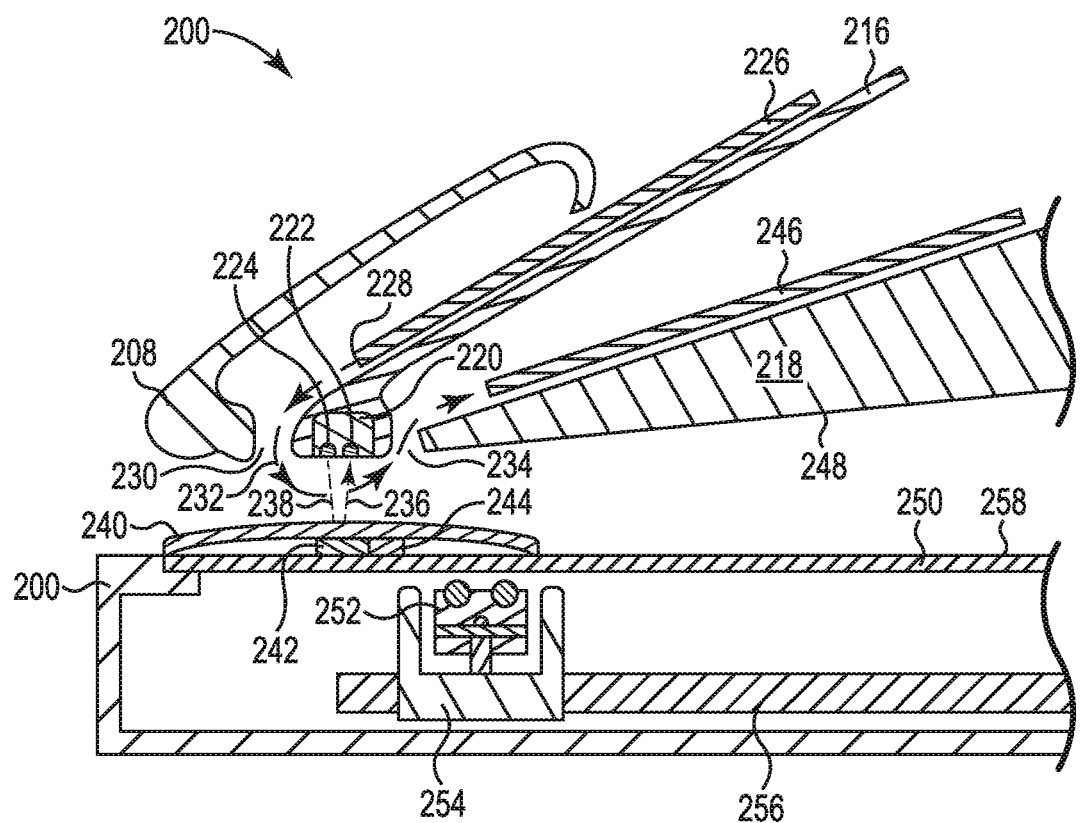
FIG. 2 illustrates a cross-sectional view of an example of an edge sensing apparatus in a closed configuration consistent with the present disclosure.

FIG. 2 illustrates a cross-sectional view of an example of an edge sensing apparatus 200 in a closed configuration consistent with the present disclosure. The edge sensing apparatus 200 may include an ADF housing 208 and a scanner body 202. The ADF housing 208 may be pivotally mounted over the scanner body 202 such that, in a closed position, a bottom side 248 of the ADF housing 208 directly faces the scanner body 202.

The ADF housing 208 may include media feeder mechanisms. A media feeder mechanism may include a mechanical conveying roller assemblies and/or guides to feed media 226 along a media path 232. Feeding media 226 along the media path 232 may include feeding media 226 from input tray 216 through the ADF housing 208. The media 226 may be fed out of an exit point 230 of the ADF housing 208. The media 226 may be fed along the media path 232 between a bottom side 248 of the ADF housing 208 including a retroreflective sensor 220 and cover glass 240. The media 226 may be fed along the media path 232 back into the ADF housing 208 through a reentrance point 234 of the ADF housing 208. The media 226 may then be deposited in the output tray 218 as scanned media 246.

The ADF housing 208 may include a retroreflective sensor 220. The retroreflective sensor 220 may be located at the bottom side 248 of the ADF housing 208. The retroreflective sensor 220 may include an emitter element 224. The emitter element 224 may emit a beam of light. The beam of light may be transmitted in a beam path 238. The retroreflective sensor 220 may be positioned on and/or within the ADF housing 208 such that the beam path 238 is directed across a media path 232 directly at a cover glass 240 when the edge sensing apparatus 200 in a closed configuration. The retroreflective sensor 220 may also include a receiver element 222. A receiver element 222 may be configured to detect reflected light 236 that is reflected back at the retroreflective sensor 220.

Figure 5:
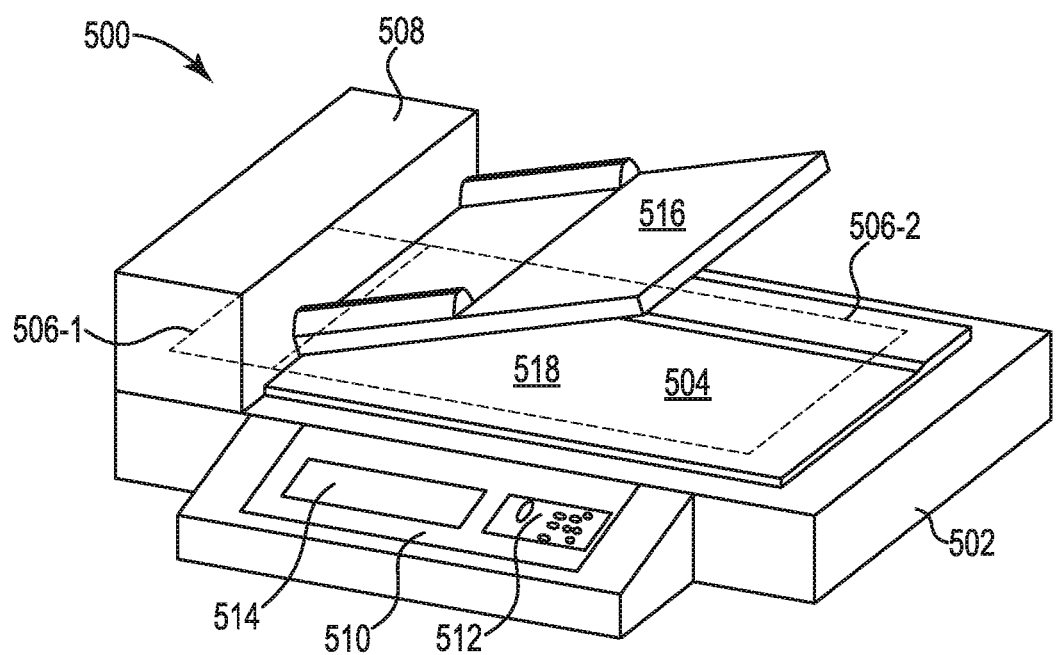
FIG. 5 illustrates a perspective view of an example of an edge sensing apparatus in a closed configuration consistent with the present disclosure.

The scanner body 202 may include a flatbed scanning area, as discussed with regard to FIG. 5. The flatbed scanning area may include different portions. A first portion may include an ADF scan window where ADF fed media is scanned. The ADF scan window may have a relatively shorter physical length than a second portion of the flat bed scanning area corresponding to a fixed scan window. The ADF scan window may be the portion of the flatbed scanning area where ADF fed media is imaged by a scanner optical assembly 252. The media may be imaged while the scanner optical assembly 252, the scanner optical assembly carriage 254 that facilitates movement of the scanner optical assembly 252, and the scanner optical assembly guide rail 256 that directs movement of the scanner optical assembly 252 are held in a substantially fixed in place.

The ADF scan window may include scanner glass 250. The scanner glass 250 may include a glass platen located above the scanner optical assembly 252. The scanner glass 250 may extend the length of a scanner bed of the edge sensing apparatus 200. Therefore, the scanner glass 250 may also span the fixed scan window portion of the scanner bed. The scanner glass 250 may include the glass that is continuous across an ADF scan window portion and a fixed scan window portion of a scanner bed. The scanner glass may include a substantially transparent glass platen.

The ADF scan window and/or the bordering areas immediately proximal to the ADF scan window may include a reflector 242. The reflector 242 may include a material with a high reflectivity relative to media 226. For example, the reflector 242 may include a reflective film such as 3M Scotchlite™ Reflective material and/or 3M™ Daylighting polymeric. The reflector 242 may be located on a top surface 258 of scanner glass 250. The reflector 242 may be located in the beam path 238 of the light transmitted from the emitter element 224 of the retroreflective sensor 220. The reflector 242 may return reflected light 236 to the receiving element 222 of the retroreflective sensor 220.

The retroreflective sensor 220 may sense the presence of media 226 in the media path 232 intersecting the beam path 238 by an alteration in the amount of reflected light 236 detected at the receiving element 222 of the retroreflective sensor 220. For example, the relatively highly reflective reflector 242 may direct a higher amount of reflected light to the receiver element 222 than a piece of media 226. As a result, when media 226 interrupts the beam path 238, the receiver portion 222 may determine that media 226 is present in the media path 232 by virtue of a decreased detection of reflected light 236 by the receiver element 222 of the retroreflective sensor 220. The retroreflective sensor 220 may identify a leading edge 228 of media 226 being fed along the media path 232 by the ADF. For example, similar to the example given above, the retroreflective sensor 220 may determine a leading edge 228 of media 226 has entered the beam path 238 and/or the corresponding intersecting portion of the media path 232 by virtue of a decreased detection of reflected light 236 by the receiver element 222 of the retroreflective sensor 220. The identification of the leading edge 228 of the media 226 may be utilized to synchronize scanning operations and/or meter a scan of the media 226.

The ADF scan window may also include a calibration label 244. The calibration label 244 may include a rectangular strip mounted on the scanner glass 250. The calibration label 244 may include various indicia that may be imaged by the scanner optical assembly 252 and/or sensed by other sensors of the edge sensing apparatus 200. Examples of indicia includes on the calibration label 244 may include markings that may be read, imaged, and/or sensed by the edge sensing apparatus 200. The indicia may instruct and/or inform the edge sensing apparatus 200 and/or a user configuring an edge sensing apparatus with regard to settings and/or operational properties (e.g., resolution of scan, scan dimensions, filters applied, brightness of scan, contrast of scan, gamma of scan, shadow of scan, sensitivity of the scanner optical assembly, etc.) of the edge sensing apparatus 200.

The ADF scan window may include a cover glass 240. The cover glass 240 may be located over the scanner glass 250. The cover glass 240 may be located on a top surface 258 of the scanner glass 250. The cover glass 240 may overlap the scanner glass 250 over the entire ADF window. The cover glass 240 may overlap the scanner glass 250 across a portion of the fixed scan window. The cover glass 240 may overlap the scanner glass 250 over a portion of the ADF window.

The cover glass 240 may cover the reflector 242 and/or the calibration label 244. For example, the reflector 242 and the calibration label 244 may be fixed between the cover glass 240 and the scanner glass 250 in the ADF scan window. The cover glass 240 may be mounted on top of the reflector 242 and the calibration label that are themselves mounted on a first surface 258 of the scanner glass 250. In an example (not illustrated), the calibration label 244 may extend out from under the cover glass and form a return path to the reentrance point 234 of the ADF housing 208. For example, the calibration label 244 may protrude out from between the cover glass 240 and the scanner glass 250 to form a ramp guiding media 226 back into the reentrance point 234 of the ADF housing 208. In other examples, the cover glass 244 may be formed to act as a guide and/or ramp to redirect media 226 back into the reentrance point 234 of ADF housing 208.

The cover glass 240 may be a substantially transparent sheet of material. The cover glass 240 may be a same or a different material than scanner glass 250. The cover glass 240 may be a glass, a plastic, or a polyester material. For example, the cover glass 240 may include tempered glass, sapphire crystal, sapphire class, etc. The cover glass 240 may include any material that would allow the transmission of infrared or visible light. The cover glass 240 may have thermal, mechanical, and optical properties (e.g., refractive index, transmission, absorption, and/or wave length dependencies) substantially identical to those of the scanner glass 250. However, the cover glass 240 may be a material that is more resistant to soiling, abrasion, and/or other degradation than scanner glass 250.

The cover glass 240 may protect the reflector 242. The cover glass 240 may protect the reflector 242 by preventing abrasion, erosion, scratching, damaging, wearing, and/or other mechanical and/or chemical interactions with the reflector 242 that may alter its reflectivity. The cover glass 240 may protect the reflector 242 from soiling of the surface by debris that may alter its reflectivity. The cover glass 240 may protect the reflector 242 by sealing off and/or shielding a reflecting surface of the reflector 242. Sealing the reflector 242 may protect it from soiling with debris and/or from wear and tear associated with interfacing with media 226 being scanned. Additionally, sealing the reflector 242 may protect it from similar damage and degradation from being open to the environment within an ADF housing 208. The cover glass 240 may serve as an interface upon which the media 226 engages in physical contact while traversing the media path 232 during a scanning operation. For example, rather than the media 226 coming in direct contact or in close proximity to an exposed reflector 242, the media 226 may come in contact with the cover glass 240 without altering the function of the reflector 242. The cover glass 240 may allow the edge sensing apparatus 200 to perform more than four times more scanning operations before the reflector 242 is cleaned and/or otherwise service.

Additionally, the orientation of the retroreflective sensor 220, the reflector 242, and/or the cover glass 240 relative to the media path 232 may allow for the reflector 242 to be a substantially self-cleaning component of the edge sensing apparatus 200. For example, the media 226 may be fed along the media path 232 utilizing the ADF. The ADF may feed the media 226 along the media path 232 such that the leading edge 228 of the media 226 may exit an exit point 230 of the ADF housing 208 and contact the cover glass 240, and specifically the cover glass 240 located over a portion of the reflector 242, at an acute angle. For example, the plane associated with the face of a sheet of paper may contact the top surface of the cover glass 240 such that the surface of the cover glass 240 and the plane associated with the face of the sheet of paper form an acute angle.

The media 226 may continue to be fed along the media path such that the leading edge 228 of the media 226 wipes across the surface of the cover glass 240 creating a wiping, squeegee, and/or scraping action across the cover glass 240 leading to a cleaning (e.g., removal of debris) of the cover glass 240. This cleaning action of the portion of the cover glass 240 located between the reflector 242 and the retro reflective sensor 220 may function to repeatedly clean the reflector 242 without abrading the surface of the reflector 242 and/or altering its reflectivity leading to an alteration in the functioning of the retroreflective sensor 220.

Further, the ADF housing 208 may interface along a bottom surface 248 with a top surface 258 of a scanner body 202. The ADF housing 208 may be pivotally mounted, such as by hinges along an edge, to the scanner body 202. The ADF housing 208 and all its component pieces (e.g., input tray 216, output tray 218, retroreflective sensor 220, etc.) may be pivoted into an open configuration where the bottom side 248 of the ADF housing 208 and the top side 258 of the scanner body 202 are exposed. In the open configuration the surface of the cover glass 240 covering a portion of the reflector 242 may be exposed and easily accessed by a user. In the open configuration, a user may clean the surface of the cover glass 240, thereby cleaning the surface of the reflector 242 by proxy without actually contacting the reflector 242, without having to disassemble portions of the edge sensing apparatus 200, open otherwise sealed portions of the edge sensing apparatus 200 to the outside environment, and/or attempt to clean delicate parts in confined operating spaces. The user may simply wipe any debris from the exposed surface of the cover glass 240 without concern for damaging the reflector 242 or other components of the edge sensing apparatus 200. Therefore, in contrast to previous systems, the edge sensing apparatus provides for self-cleaning without direct wear on the reflector 242 component of a retroreflective sensing apparatus. Further, when manual cleaning is desired, easy open access to the components of retroreflective sensing apparatus is provided.

Figure 3:
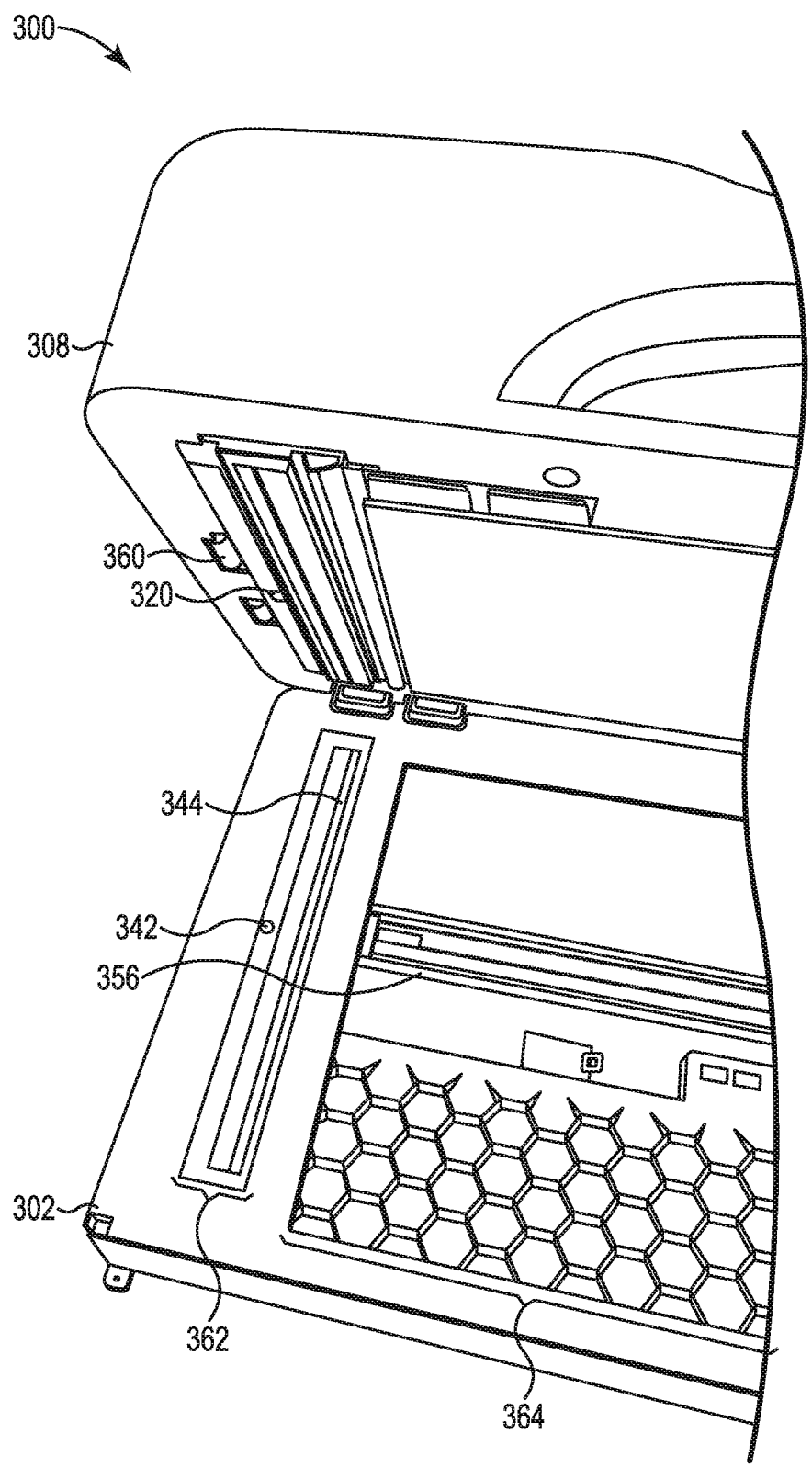
FIG. 3 illustrates a perspective view of an example of an edge sensing apparatus in an open configuration consistent with the present disclosure.

FIG. 3 illustrates a perspective view of an example of an edge sensing apparatus 300 in an open configuration consistent with the present disclosure. The edge sensing apparatus 300 may include an ADF housing 308. The ADF housing 308 may include media feeding mechanisms to feed media along a media path. For example, the ADF housing 308 may include a media feeder 360 (e.g., mechanical feeding rollers) to contact media and propel it along a media path.

The ADF housing 308 may include a retroreflective sensor 320. The retroreflective sensor 320 may include an emitting element and a receiving element. The retroreflective sensor 320 may utilize a reflector 342; however the reflector may not be located in the ADF housing 308. Instead, the reflector 342 may be located on a scanner body 302. The retroreflective sensor 320 may emit a beam of light out of the ADF housing 308 and detect the portion of that light that is reflected back to the ADF housing 308. The reflector 342 may be aligned on the scanner body 302 such that it is within the beam path of the light emitted from the retroreflective sensor 320 and such that it may reflect back the beam of light to the retroreflective sensor 320 when the edge sensing apparatus is in a closed configuration.

In addition to the reflector 342, the scanner body 302 may include a scanner optical assembly (not visible as illustrated, but located beneath calibration label 344). The scanner optical assembly may be configured to be moved along the length of the scanner body 302. The scanner optical assembly may be moved along guide rail 356. The scanner optical assembly may be moved along the guide rail 356 while imaging a stationary document manually placed on a fixed scan window 364 portion of the scanner body 302. The scanner optical assembly may remain in a substantially fixed location under the ADF scan window 362 (as illustrated) and media may be automatically fed over the stationary scanner optical assembly in an operation utilizing the ADF.

Although not apparent from the illustrated angle, portions of the ADF scan window 362 and/or portions of the fixed scan window 364 may include a base layer of scanner glass and/or a second layer of cover glass over the top of the scanner glass. In an example, the cover glass may be layered over the scanner glass exclusively in the ADF scan window 362. The reflector 342 may be located between the scanner glass and the cover glass. For example, the reflector 342 may be mounted on the scanner glass, the cover glass may be mounted on the reflector, and the media may pass over and in contact with the cover glass during scanning operations utilizing the ADF.

FIG. 1, FIG. 2, and FIG. 5 illustrate the edge sensing apparatus in a closed configuration. FIG. 3 illustrates the edge sensing apparatus in an open configuration. The closed configuration may be associated with performing scanning operations, storage, standby, etc. The open configuration may be achieved by a clamshell-like separation of the ADF housing 308 from the scanner body 302 along a hinged edge joining the two. The open configuration may be associated with cleaning, servicing, loading media on the fixed scan window 364, etc. It may be appreciated that this design may allow the retroreflective sensor 320 and its reflector 342 to open and separate along with their appended housings. This allows for easy access to both the retroreflective sensor 320 and the reflector 342 for cleaning and/or servicing.

The edge sensing apparatus 300 may determine whether it is in an open or a closed configuration. The edge sensing apparatus 300 may utilize the retroreflective sensor 320 and/or the reflector 342 to determine if it is in an open or closed configuration. For example, the retroreflective sensor 320 may include an emitter element and a receiver element. The emitter element may emit light. The light may be emitted from the ADF housing 308 and reflect off the reflector 342 on the scanner body 302 and be received and detected by the receiver element registering a first amount of reflectivity. This amount may be associated with a closed configuration with no media present in the media path.

Alternatively, media traversing a beam path-intersecting media path may interrupt the beam path of the light emitted reflecting a different amount of light back to the receiver element. Additionally, some light may be transmitted through the media to the reflector 342 and then reflected back to and through the media onto the receiver element. Cumulatively, this reflected light may be received and detected by the receiver element as a second weaker amount of reflectivity. This amount may be associated with a closed configuration with media present in the media path.

In another alternative, the edge sensing apparatus 300 may be in an open configuration and substantially all of the light emitted from the emitter element of the retroreflective sensor 320 may be emitted unimpeded into the environment with substantially no proximate means for reflection. Therefore, the receiver element may receive and detect no reflection. The receiver may detect this amount as a third amount of reflectivity. The third amount may be associated with an open configuration.

The edge sensing apparatus 300 may determine, based on detection of the first, second, or third signal by the retroreflective sensor 320, whether it is in an open or closed configuration. The edge sensing apparatus 300 may determine an open or closed configuration based solely on detection of signals by the retroreflective sensor 320 or the edge sensing apparatus 300 may utilize additional sensors and/or detected signals in conjunction with the signals detected by the retroreflective sensor 320 to determine an open or closed configuration. The edge sensing apparatus 300 may adjust settings, change scan modes (e.g., ADF vs. Fixed), prevent operations, prompt warnings, provide instructions, etc. based on the determination of either an open or closed configuration.

Figure 4:
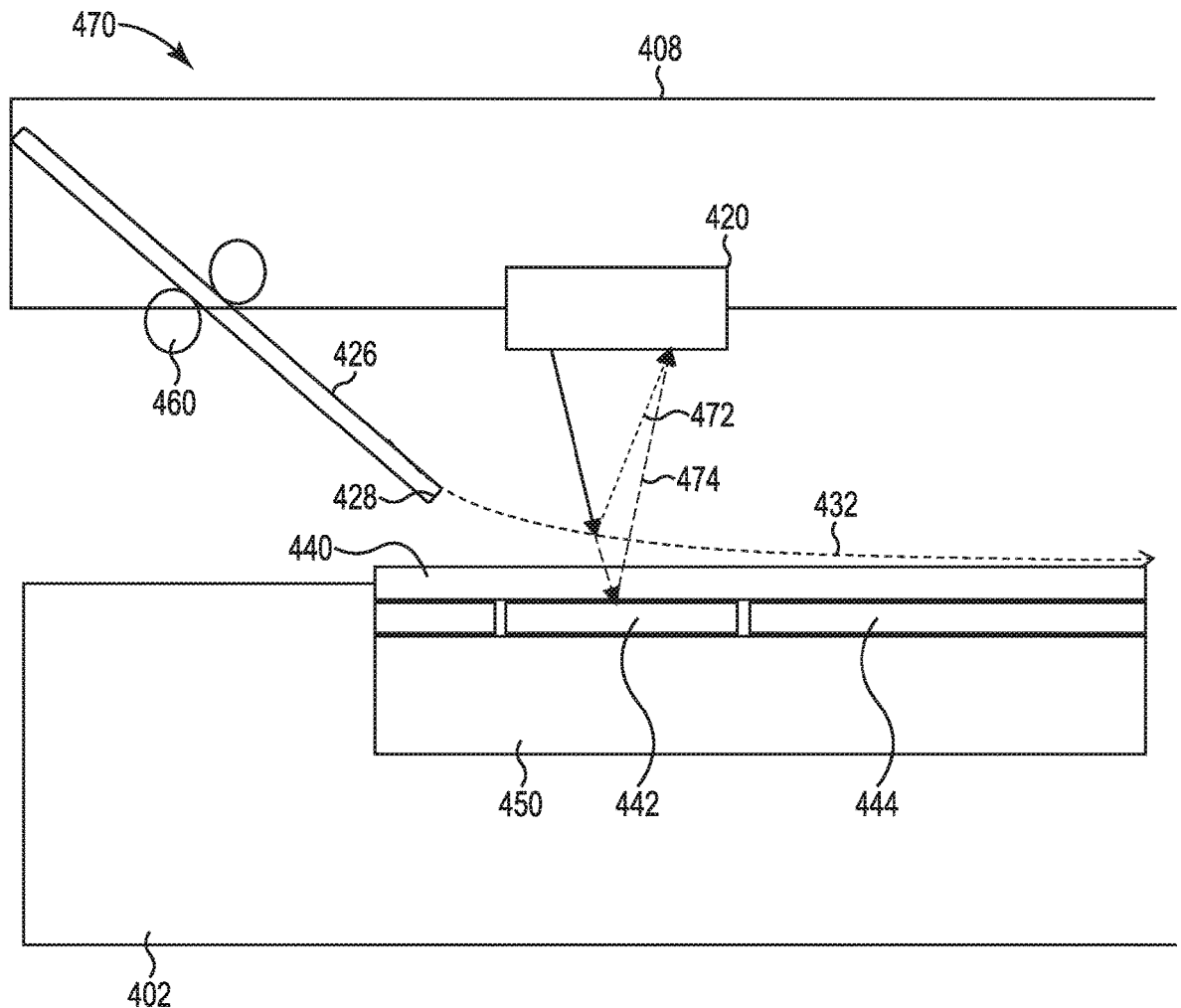
FIG. 4 illustrates an example of an edge sensing system consistent with the present disclosure.

FIG. 4 illustrates an example of an edge sensing system 470 consistent with the present disclosure. The system 470 may include any of the components and or functionalities described above with respect to the apparatuses of FIGS. 1-3 or below with respect to FIG. 5. The system 470 may include a retroreflective sensor 420. The retroreflective sensor 420 may be located on an underside of an ADF housing 408. For example, the retroreflective sensor 420 may be located on a side of an ADF housing 408 that faces a scanner optical assembly.

The retroreflective sensor 420 may emit a beam of light. The system 470 may include a reflector 442 for use as a component of a retroreflective sensor apparatus including the retroreflective sensor 420 and the reflector 442 for reflecting emitted light from the retroreflective sensor emitter 420 back to the retroreflective sensor receiver 420. The reflector 442 may not be electrically connected to the retroreflective sensor 420. The reflector 442 may be fixed to a scanner body 402 such that it is in the beam path of the light emitted from the retroreflective sensor 420 when the ADF housing 408 and the scanner body 402 are in a closed configuration associated with performing a scanning operation.

The reflector 442 may be located between scanner glass 450 and a cover glass 440. The cover glass 440 may be fixed to the scanner body 402 and/or fixed to a portion of the scanner glass 450. The reflector 442 may be located proximal to a calibration label 444. For example, the reflector 442 may be located beside a calibration label 444 that is also located between scanner glass 450 and a cover glass 440.

The system 470 may include a media feeder 460. The media feeder 460 may include mechanical feeding rollers to contact media 426 and propel it along a media path 432. The media feeder 460 may feed the media 426 between the cover glass 440 and the retroreflective sensor 420 at an acute angle relative to the cover glass 440. Feeding the media 426 in this manner may cause the leading edge 428 of the media to wipe debris from the cover glass 440 keeping the light path from the retroreflective sensor 420 to the reflector 442 self-cleaned and unimpeded. Since the reflector 442 is sealed off from the environment by the cover glass 440, the need to clean the surface of the reflector is obviated and wiping the cover glass 440 serves as a proxy for cleaning the reflector 442.

In the event that the self-cleaning mechanism described above does not remove particular debris from the surface of the cover glass 440, a clamshell-like separation of the ADF housing 408 from the scanner body 402 along a hinged edge joining the two may be performed by the user. When separated in the manner described the retroreflective sensor 420 and cover glass 440 are openly accessible to a user for cleaning and/or servicing.

The retroreflective sensor 420 may identify a leading edge 428 of the media 426 based on a change in detected reflectance. For example, the retroreflective sensor may emit light and detect the light reflected back, as described above. A strong reflective signal 474 (e.g., a high proportion of emitted light received back) may be indicative that the beam path between the emitter element of the retroreflective sensor 420 and the reflector 442 is unimpeded and that no media is in the intersecting media path 432. A weaker reflective signal 474 (e.g., a proportion of emitted light received back that is lower than the strong reflective signal 474) may be indicative that the beam path between the emitter element of the retroreflective sensor 420 and the reflector 442 is impeded and that media is in the intersecting media path 432. Therefore, when the reflected light detected by the retroreflective sensor 420 is reduced a leading edge 428 of media 426 may be identified as entering the beam path and traversing the media path 432. Identification of the leading edge 428 of the media 426 by the retroreflective sensor 420 may be utilized to meter a scan and/or to adjust a scan property.

Additionally, substantially no reflected light may be detected by the retroreflective sensor 420. This may be indicative of the ADF housing 408 and the scanner body 402 being in an open configuration with all the emitted light escaping into the surrounding environment with substantially no reflection.

The edge sensing system 470 may continuously or periodically monitor the amount of reflected light detected by the retroreflective sensor 420 over a period of time. By monitoring the change in the amount of reflected light detected, the edge sensing system 470 may monitor the level of wear, damaging, and/or soiling of the cover glass 440 over the reflector 442 and/or of the emitting and receiving face of the retroreflective sensor 420. If the amount of reflected light detected by the retroreflective sensor 420 falls below a predetermined threshold amount, the edge sensing system 470 may prompt a user to perform a cleaning operation upon the cover glass 440 over the reflector 442 and/or of the emitting and receiving face of the retroreflective sensor 420

FIG. 5 illustrates a perspective view of an example of an edge sensing apparatus 500 in a closed configuration consistent with the present disclosure. The apparatus 500 may be a flatbed scanner and/or a flatbed scanner portion of a multiple function device (MFD) having scanning, printing, copying, facsimile, and digital sending capabilities. The apparatus 500 may include a scanner body 502. The scanner body 502 may include a main body or frame for the flatbed scanner. The scanner body 502 may house the scanner optical assembly, a carriage for moving the scanner optical assembly, and/or a guide shaft for guiding the movement of the scanner optical assembly. As used herein, a scanner optical assembly may include an image sensor and/or illumination for an image sensor. For example, a scanner optical assembly may include a charge-coupled device (CCD) image sensor, a CCD array, a photomultiplier tube (PMT) image sensor, a camera, a digital camera, etc. A scanner optical assembly may be referred to as a scan bar and/or scan head unit.

The scanner body 502 may include a scanner bed 504 (outlined by a dashed line). The scanner bed 504 may include a substantially transparent surface and/or surfaces upon which media may be placed and/or passed and through which images of the media may be captured. The scanner bed 504 may include a glass pane or platen located above the scanner optical assembly. As used herein, glass may refer to a platen. The glass may have a variety of chemical compositions and physical properties. The scanner bed 504 may include a first portion 506-1 (outlined by a dashed line) and a second portion 506-2 (outlined by a dashed line). The first portion 506-1 of the scanner bed 504 may include an ADF scan window. As used herein, an ADF scan window may include the portion of the scanner bed 504 that includes the surface area of substantially transparent material, such as glass, utilized in creating a scan of media with the ADF. The first portion 506-1 of the scanner bed 504 may correspond to a portion of the glass platen under which the scanner optical assembly remains substantially fixed while the media is passed along a media path traversing the portion of the glass platen.

The first portion 506-1 may include a calibration label. As used herein, a calibration label may include reference indicia for calibrating a scanner operation. The first portion 506-1 may also include the reflector portion of a retroreflective sensor. The reflector portion may include a reflective material (e.g., a mirror, reflective tape, 3M Scotchlite™ Reflective material, 3M™ Daylighting polymeric film, etc.). The reflector and/or the calibration label may be mounted on top of scanner glass. As used herein, scanner glass may include a first layer of the glass platen immediately above the scanner optical assembly.

The first portion 506-1 may include cover glass. The reflector and/or calibration label may be mounted between the cover glass and the scanner glass (e.g., below the cover glass and above the scanner glass). As used herein, the cover glass may include a second layer of the glass platen above the scanner optical assembly that may protect the reflector and/or calibration label thereunder. The cover glass may be a same or a different material from the scanner glass.

The second portion 506-2 may include a fixed scan window portion of the scanner bed 504. As used herein, a fixed scan window portion may correspond to a portion of the glass platen under which the scanner optical assembly moves along a guide shaft while the media remains stationary on the glass platen during a scanning operation. The second portion 506-2 may include an extension of the scanner glass from first portion 506-1.

The scanner body 502 may include a user interface 510 which enables a user to submit jobs for the edge sensing apparatus 500. The user interface 510 may enable a user to configure copying, scanning, faxing, digital sending, and/or printing characteristics of the edge sensing apparatus 500 and may include a key or keypad 512 and a display screen 514.

The apparatus 500 may include an ADF housing 508. As used herein, an ADF housing 508 may include a body or frame that contains ADF media feeder mechanisms such as mechanical conveying roller assemblies and/or guides to feed media along a path that traverses the imaging path (e.g., portion of space imaged by the scanner optical assembly during an ADF scanning operation) of the scanner optical assembly. The ADF housing 508 may include an exit point, where media exits the ADF housing 508 to come in contact with the scanner bed 504, and a reentrance point, where media renters the ADF housing 508 following imaging of the media on the scanner bed 504 utilizing the scanner optical assembly. The exit point and the reentrance point of the ADF housing 508 may be located on a bottom side of the ADF housing 508 (e.g., a side of the ADF housing 508 facing the scanner bed 504 when the edge sensing apparatus 500 is in a closed configuration).

The ADF housing 508 may also include a retroreflective sensor. The retroreflective sensor may also be located on the bottom side of the ADF housing 508 (e.g., the side of the ADF housing 508 facing the scanner bed 504 when the edge sensing apparatus 500 is in a closed configuration). The retroreflective sensor may be located on the bottom side of the ADF housing 508 in a position directly opposing the reflector on the scanner bed 504 that the bottom side of the ADF housing 508 faces in a closed configuration. The retroreflective sensor may be located between the exit point and the reentrance point of the ADF housing 508. This location may allow the retroreflective sensor to identify the leading edge of media being fed by the ADF by sensing an alteration in the amount of received reflected light at the retroreflector sensor caused by the introduction of the leading edge of the media into the beam path of the retroreflective sensor.

The ADF housing 508 may include a document input or infeed tray 516 and a document output or outfeed tray 518. In operation, a user may insert media to be scanned into the input tray 516. Individually scanned pages of the media may then be collected in output tray 518. In operation the ADF media feeder mechanisms within the ADF housing 508 may grab the media from the input tray 516 and feed the media along a media feed path out an exit point of the ADF housing 508 onto and/or across the scanner bed 504 (e.g., along a media path between the cover glass and the retroreflective sensor), back into the reentrance point of the ADF housing 508, and to the output tray 518.

The ADF housing 508 and component pieces (e.g., input tray 516, output tray 518, retroreflective sensor, etc.) may be arranged atop the scanner body 502, but may be pivotally mounted, such as hinged along an edge to allow the edge sensing apparatus 500 to be pivoted into an open configuration where the bottom side of the ADF housing 508 and the scanner bed 504 are exposed. Additionally, a user may utilize this pivotal mounting to lift the ADF housing 508 rotating it away from the scanner bed 504 to an open configuration to place media on the scanner bed 504 (e.g., second portion 506-2). The user may then pivot the ADF housing 508 back into place over the scanner bed 504 into a closed configuration for scanning the media.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein. "a number of" an element and/or feature can refer to one or more of such elements and/or features.

What is claimed:

1. An edge sensing apparatus comprising:
   a retroreflective sensor to emit a beam of light along a beam path and to detect reflected light in response to the emitted beam of light;
   a reflector in the beam path of the retroreflective sensor;
   a cover glass located between the retroreflective sensor and the reflector, the cover glass to protect the reflector; and
   a media feeder to feed a media along a media path between the cover glass and the retroreflective sensor.

2. The edge sensing apparatus of claim 1, wherein data from the retroreflective sensor is utilized to identify a leading edge of the media feeding along the media path based on a change in the reflected light which is reflected from the leading edge of the media as compared to being reflected from the reflector.

3. The edge sensing apparatus of claim 1, further including a scanner optical assembly to image the media, wherein the retroreflective sensor is located on a scanner optical assembly-facing side of an automatic document feeder housing.

4. The edge sensing apparatus of claim 3, wherein the automatic document feeder housing is hinged on a rotating pivot to lift off of a scanner bed exposing the cover glass.

5. The edge sensing apparatus of claim 1, further comprising a scanner bed and a calibration label on the surface of the scanner bed and beneath the cover glass, the reflector being located on a surface of the scanner bed.

6. The edge sensing apparatus of claim 1, further including a scanner glass and a scanner optical assembly to image the media, wherein the reflector is located between the cover glass and the scanner glass.

7. An edge sensing apparatus comprising:
   a retroreflective sensor located on a scanner optical assembly-facing side of an automatic document feeder housing, the retroreflective sensor to emit a beam of light along a beam path and to detect reflected light in response to the emitted beam of light;
   a reflector in the beam path of the retroreflective sensor, wherein the reflector is located between scanner glass and a cover glass fixed to a scanner body; and
   a media feeder to feed a media along a media path between the cover glass and the retroreflective sensor.

8. The edge sensing apparatus of claim 7, wherein data from the retroreflective sensor is utilized to determine whether the automatic document feeder housing is pivoted in a closed position over the scanner body based on a presence of reflected light from the reflector and in response to the beam of light emitted by the retroreflective sensor, wherein the beam path is directed across the media path directly at the cover glass when the automatic document feeder housing is pivoted in the closed position.

9. The edge sensing apparatus of claim 7, wherein the media path exits the automatic document feeder housing and traverses an imaging path of a scanner optical assembly before reentering the automatic document feeder housing, the retroreflective sensor including an emitter element to emit the beam of light along the beam path and a receiver element to detect the reflected light in response to the emitted beam of light.

10. The edge sensing apparatus of claim 9, wherein the beam path of the retroreflective sensor is located between an exit point of the automatic document feeder housing and a reentrance point of the automatic document feeder housing.

11. The edge sensing apparatus of claim 7, wherein the media feeder is to feed a leading edge of the media along a portion of the media path including the cover glass at an acute angle relative to the cover glass, and the retroreflective sensor is to identify the leading edge in response to a decreased detection of reflected light from the light emitted by the retroreflective sensor along the beam path.

12. The edge sensing apparatus of claim 7, wherein the retroreflective sensor is to emit the beam of light along the beam path that passes through the media path and toward the cover glass, and to detect the reflected light in response to the beam of light.

13. The edge sensing apparatus of claim 7, wherein the retroreflective sensor is to identify a leading edge of the media feeding along the media path based on an amount of reflected light detected in response to the beam of light, wherein a first light reflected from the reflector is a greater amount of light than a second light reflected from the leading edge of the media.

14. An edge sensing system comprising:
a retroreflective sensor located on a scanner optical assembly-facing side of an automatic document feeder housing, the retroreflective sensor to emit a beam of light along a beam path and to detect reflected light in response to the emitted beam of light;
a reflector in the beam path of the retroreflective sensor, wherein the reflector is located between scanner glass and a cover glass fixed to a scanner body; and
a media feeder to feed media between the cover glass and the retroreflective sensor at an acute angle relative to the cover glass to wipe debris from the cover glass.

15. The edge sensing system of claim 14, wherein the automatic document feeder housing is to pivot away from the scanner body to an open configuration providing access to a scanner bed for flatbed scanning.

16. The edge sensing system of claim 15, wherein the open configuration exposes the cover glass for cleaning, the cover glass to protect the reflector and to serve as an interface upon which the media engages in physical contact with while traversing the media path during a scanning operation.

17. The edge sensing system of claim 15, wherein data from the retroreflective sensor is utilized to determine whether the automatic document feeder housing is in the open configuration.

18. The edge sensing system of claim 14, wherein the retroreflective sensor identifies a leading edge of the media based on a change in detected reflectance.

19. The edge sensing system of claim 14, wherein the retroreflective sensor detects whether a manual cleaning operation should be performed based on an amount of reflected light detected.

20. The edge sensing apparatus of claim 14, wherein the media path is along a portion of the cover glass, and the cover glass is to provide protection to the reflector and to engage in physical contact with the media while the media traverses along a portion of the media path.

* * * * *